United States Patent
Ben-Ezra et al.

(10) Patent No.: US 7,440,634 B2
(45) Date of Patent: Oct. 21, 2008

(54) METHOD FOR DE-BLURRING IMAGES OF MOVING OBJECTS

(75) Inventors: Moshe Ben-Ezra, Princeton, NJ (US); Shree K. Nayar, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 824 days.

(21) Appl. No.: 10/870,814

(22) Filed: Jun. 17, 2004

(65) Prior Publication Data

US 2005/0047672 A1 Mar. 3, 2005

Related U.S. Application Data

(60) Provisional application No. 60/479,067, filed on Jun. 17, 2003.

(51) Int. Cl.
G06K 9/40 (2006.01)
G06K 9/36 (2006.01)

(52) U.S. Cl. .......................... 382/255; 382/284

(58) Field of Classification Search ................ 382/255, 382/103, 284
See application file for complete search history.

(56) References Cited

U.S. PATENT DOCUMENTS 5,109,435 A * 4/1992 Lo et al. ..................... 382/103
5,737,456 A * 4/1998 Carrington et al. .......... 382/299
6,177,675 B1 * 1/2001 Gagnon et al. ............ 250/363.1
2002/0085096 A1 * 7/2002 Mertens et al. ............. 348/161
2004/0057602 A1 * 3/2004 Kondo et al. ................ 382/107

FOREIGN PATENT DOCUMENTS

WO 03019446 3/2003
WO 04001667 12/2003

OTHER PUBLICATIONS

Y. Yitzhaky et al., "Comparison of direct blind deconvolution methods for motion-blurred images," Applied Optics, vol. 38, pp. 4325-4332, 1999.*
H. Trussell and S. Fogel, "Identification and restoration of spatially variant motion blurs in sequential images," Image Processing, IEEE Transactions on, vol. 1, pp. 123-126, 1992.*

* cited by examiner

Primary Examiner—Bhavesh Mehta
Assistant Examiner—John B Strege
(74) Attorney, Agent, or Firm—Baker Botts LLP (57) ABSTRACT

Systems and methods for providing methods are provided for deblurring images, which are blurred due to the movement of objects in the imaged scene. The systems and methods involve separating a moving object component from a static or background component of a primary image. The moving object component is deblurred using suitable image processing algorithms, and then superimposed on the static or background component to obtain a deblurred primary image.

16 Claims, 9 Drawing Sheets

Figure 1: The fundamental tradeoff between spatial resolution and temporal resolution of an imaging system. While a conventional video camera (white dot) is a single operating point on the tradeoff line, a hybrid imaging system uses two different operating points (gray dots) on the line, *simultaneously*. This feature enables a hybrid system to obtain the additional information needed to deblur images.

Figure 2: Three conceptual designs of a hybrid camera. (a) The primary and secondary detectors are essentially two separate cameras. (b) The primary and secondary detectors share the same lens by using a beam splitter. (c) The primary and secondary detectors are located on the same chip with different resolutions (pixel sizes).

Figure 3: The hybrid camera prototype used in the experiments is a rig of two cameras. The primary system consists of a 3M pixel Nikon CoolPix camera equipped with a ×6 Kenko zoom lens. The secondary system is a Sony DV camcorder. The Sony images were reduced in size to simulate a low-resolution camera.

Figure 4: The computation of the continuous PSF from the discrete motion vectors. (a) The discrete motion vectors which are samples of the function $f : t \mapsto (x, y)$. (b) Interpolated path $f(t)$ and its division into frames by Voronoi tessellation. (c) Energy estimation for each frame. (d) The computed PSF, $h(t)$.

(a) Blending function of the motion blurred object with the background: $M \otimes S$.

(b) Background component of the motion blurred image: $B \cdot \overline{M \otimes S}$ (c) Separating the object from its background: $I - (B \cdot \overline{M \otimes S})$ (d) Object deblurring: $(I - (B \cdot \overline{M \otimes S})) \otimes^{-1} S$ (e) Composite of the deblurred object and the clear background: $(I - (B \cdot \overline{M \otimes S})) \otimes^{-1} S + B \cdot M$.

Figure 5: The process of deblurring object motion. (a) to (c) show the separation of the blurred object from the background. (d) shows blurred object deconvolution, and (e) shows the compositing with the clear background to form a non-blurred image.

Figure 6

Figure 7: Object deblurring simulation result. (a) Non-blurred ground truth image. (b) Synthetically blurred image. (c) Naive deblurring. Notice the blending of the background and the foreground. (d) Deblurring only the object and compositing. Notice the absence of undesired blending of the foreground and the background.

(a) Ground truth  (b) Synthetically blurred (c) Blurred foreground object  (d) Deblurred foreground object (e) Object composite with a clear background image Figure 8: Object blending problem. (a) Non-blurred ground truth image. (b) Synthetically blurred image. (c) Blurred foreground image. The non-masked area is exactly the blur object extent. Notice that the foreground is blended with the background. (d) Deblurring of the foreground object. The artifacts due to blending are clearly visible. (e) Composite of the clear background with the deblurred foreground using a ground truth composite mask. The resulting image does not look natural.

Figure 9: Object deblurring simulation result. (a) Blending mask obtained from the secondary detector's image sequence. (b) Background component obtained from a clear background image and the blending mask. (c) Blurred foreground obtained by subtracting the background component from the primary detector's blurred image. (d) Deblurred image of the foreground object. (e) Composite of the deblurred foreground and the clear background using a low resolution mask obtained from the secondary detector.

METHOD FOR DE-BLURRING IMAGES OF MOVING OBJECTS

CROSS-REFERENCE TO PRIORITY AND RELATED APPLICATIONS

This application claims the benefit of U.S. provisional patent application Ser. No. 60/479,067 filed Jun. 17, 2003 and International patent application No. PCT 2003/019446 filed on Jun. 18, 2003 claiming the benefit of U.S. provisional patent application Ser. No. 60/390,336 filed Jun. 21, 2002. The International patent application was published in English under PCT Article 21(2) as International Patent Publication No. WO2004001667, it and all of the priority applications are incorporated by reference in their entireties herein.

NOTICE OF GOVERNMENT RIGHTS

The United States government has certain rights in the present invention pursuant to National Science Foundation ITR Award No. IIS-00-85864.

BACKGROUND OF THE INVENTION

The present invention relates to techniques for digitally capturing and processing images of a scene using an image detector, and more particularly, to techniques for correcting blurring introduced into such images due to motion of the image detector or due to movement of objects.

Motion blur due to camera shake is a common problem in photography, especially in conditions involving zoom and low light. Merely pressing a shutter release button on the camera can in and of itself cause the camera to shake, and unfortunately cause blurred images. This problem is especially prevalent in digital photography, where lightweight cameras with automated exposure times that are not easily stabilized are common, and where automated exposure times often necessitate relatively long stabilization periods to ensure a non blurred image. The compact form and small lenses of many of these cameras only serves to increase this problem.

The sensor of a digital camera creates an image by integrating energy over a period of time. If during this time—the exposure time—the image moves, either due to camera or object motion, the resulting image will exhibit motion blur. The problem of motion blur is increased when a long focal length (zoom) is employed, since a small angular change of the camera creates a large displacement of the image, and in situations when long exposure is needed, either due to lighting conditions, or due to the use of small aperture.

There are putative solutions to this problem. One group of solutions focuses on the reduction or elimination of relative movement between the camera and the scene during the integration or exposure time. Such solutions include the use of a tripod, flash photography, the use of increased sensor sensitivity, the use of an increased aperture, and dynamic image stabilization.

A stable tripod that can resist wind, and a shutter release cable that does not transmit hand vibration to a camera mounted on such a tripod, eliminates the problem of camera shake where both the mounted camera and scene are static. In practice only professionals are likely to use a tripod and shutter release cable on a regular basis. Moreover, the use of a tripod does not solve the problem of shooting from a moving platform, such as car, train, helicopter or balloon.

A photographic flash produces a strong light flux that sustained for a fraction of a section (less than $1/1000$). The exposure time is set to bracket the flash time (usually $1/60$ sec), and the aperture of the camera is set to match the flash flux. Therefore, blur caused by motion during the bracket time has very low intensity. In essence, the flash "freezes" motion of both camera and moving objects. However, objects in bright daylight may still have motion blur and, of course, flash photography is useful only if the distance between the flash and the object is small.

Increasing the sensor sensitivity, and therefore reducing the exposure time, can decrease the problem of motion blur. However, it cannot eliminate blur completely. However, sensitive sensors (whether film or CCD) produce noisy and grainy images.

Increasing the aperture size greatly decreases the required exposure time, and thus reduces motion blur. Unfortunately, the cost and weight of a camera also increase significantly with an increased lens aperture, and further a tripod may be required to comfortably handle such increased weight. Also, the use of a larger aperture lens is applicable only for more expensive cameras where it is possible to replace the lens.

In addition, the use of dynamic image stabilization involves the incorporation of inertial sensors, such as gyroscopes, to sense and compensate for camera shake in real time by moving an optical element. While this technology can be used in stabilized zoom lens for Single Lens Reflex ("SLR") cameras, it is costly, and its effectiveness is limited to approximately $1/60$ of a second for typical 400 mm zoom lens. The sensitivity of such system to very slow motion may also be limited, and may suffer from drift. In addition, such system cannot compensate for constant speed motion, such as occurs when taking images from a moving train.

Accordingly, while addressing the problem of motion of the camera itself is useful in certain applications, it does not lead to an adequate solution to the problem of motion blur as such systems are either limited, very costly, or both. An alternative approach is to correct blur after the image has been taken by using a de-blurring algorithm.

Co-invented and co-assigned International patent application WO 2004001667 describes hybrid systems and methods for deblurring a motion blurred image of a scene. The motion blurring may, for example, be due to camera or detector motion. The described hybrid systems and methods involve deploying a secondary image detector in addition to the primary detector that senses the motion blurred primary image of a scene. The secondary detector is deployed to sense additional or secondary images of the scene. An image processor estimates a point spread function based on the secondary images to characterize the motion seen in the primary image. This point spread function may be applied globally to the motion blurred primary image to generate a de-blurred image.

Images may also be blurred because the scene includes moving objects. A scene may include a stationary background through which objects move. The movement of an object in a scene may blur portions of the recorded images corresponding to the moving object in addition to any image blurring due to camera motion. A global transformation of an image cannot remove the relative motion of the object and the background in the scene. Thus, point spread functions that are applied globally to a motion blurred primary image to correct for camera motion are ineffective in deblurring motion blur caused by moving objects internal to the scene.

Further consideration is now being given to systems and methods for de blurring motion blurred primary images. In particular attention is directed to deblurring images of scenes that involve moving objects.

SUMMARY OF THE INVENTION

In accordance with the invention, systems and methods are provided for deblurring images, which are blurred due to the movement of objects in the imaged scene. The systems and methods involve separating a moving object component from a static or background component of the primary image. The moving object component is deblurred using suitable image processing algorithms, and then superimposed on a static or background component to obtain a deblurred primary image. The static or background component on which the moving component is superimposed (or both components) also may be deblurred to account for any blurring caused, for example, by camera motion or shake.

A point spread function (PSF), which describes the movement of the moving object, may be derived from information on the kinetics of the moving object. Hybrid imaging systems may be used to collect information the on the kinetics of the moving object. An useful hybrid imaging system has, in addition to the primary detector utilized for capturing the primary image, a secondary detector for collecting additional scene information including information on the kinetics of the moving object. The secondary detector may have a lower spatial resolution than that of the primary. The moving object component of the primary image is deblurred by deconvolution of the blurred component with the PSF.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Throughout the figures, the same reference numerals and characters, unless otherwise stated, are used to denote like features, elements, components or portions of the illustrated embodiments.

DETAILED DESCRIPTION OF THE INVENTION

Systems and methods for de-blurring motion-blurred images are provided. The systems and methods may, for example, be used to deblur images or a sequence of images of a scene that includes moving objects in a stationary background. An image of a scene with a moving object is compared with a background image of the scene without the moving object in it to decouple the image portions that are blurred due to the movement of the object and image portions that correspond to the stationary background. For this purpose, a mask or filter, which accounts for the shape of the object and the motion of the object, is used to extract a static background portion of the motion-blurred image and to isolate moving object components of the motion-blurred images.

The moving object components are deblurred using, for example, image deconvolution with a suitable point spread function (PSF) which models the motion of the object. The deblurred moving object components then are super imposed on a static background image portion to generate a deblurred image.

The suitable PSF that is used to model the motion of the object may be computed utilizing, for example the hybrid imaging systems and methods that are described in International patent application WO2003US19446, incorporated by reference herein. The referenced application describes the use of an estimated point spread functions to compensate the effects of camera movement on images. To aid in the understanding of the present invention several aspects of the hybrid imaging systems and methods of the referenced application are described herein.

Figure 2:
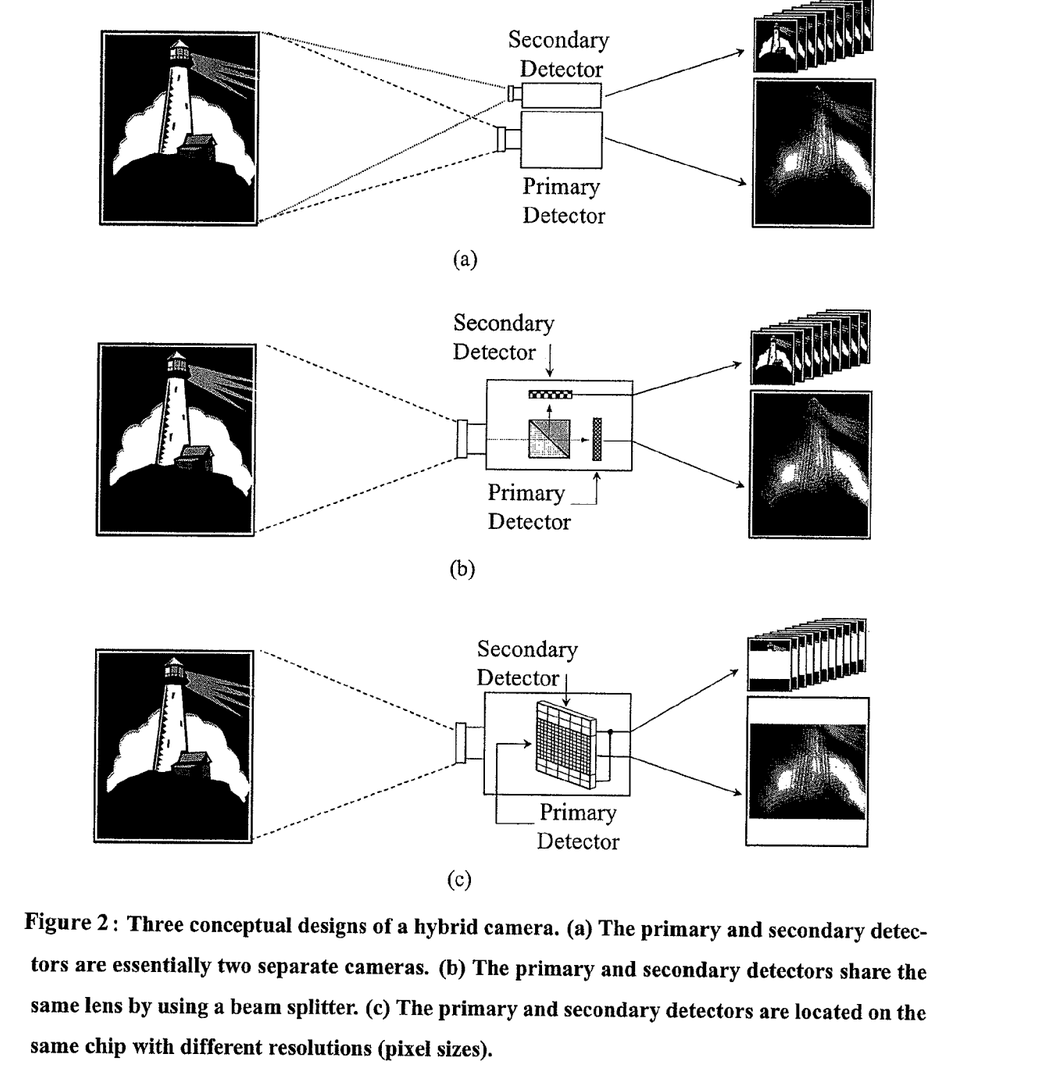
FIGS. 2(a)-2(c) are schematic illustrations of hybrid high resolution/low resolution imaging systems having multiple detectors that can be used for implementations of the present invention.

FIGS. 2(a)-2(c) show exemplary hybrid camera systems similar to those described in the referenced international application that also may be used in implementations of the present invention. Each hybrid camera system includes a primary image detector for capturing an image of the scene, as well as a secondary detector for capturing information useful for estimating point spread functions (PSF) that are used to correcting blurring introduced into the image due to camera motion. The primary image detector may be a high resolution imaging device while the secondary detector may be a simple, low cost, and low resolution imaging device The hybrid imaging systems of WO 2004001667 trade off spatial and temporal resolution differences between the primary and the secondary detectors to estimate useful PSFs for modeling camera motion. An image is formed when light energy received at an image detector pixel is integrated over an exposure time interval. The temporal resolution (number of images per second) of an image detector is proportional to a "minimum" exposure time for an useful image to register. The minimum exposure time must be such that the integrated light energy is above a certain minimum detection level, which is determined by signal-to-noise characteristics of the detector. For a given incident light flux level, the minimum exposure time also is inversely proportional to the pixel area, which itself is inversely proportional to spatial resolution of the image detector.

Figure 1:
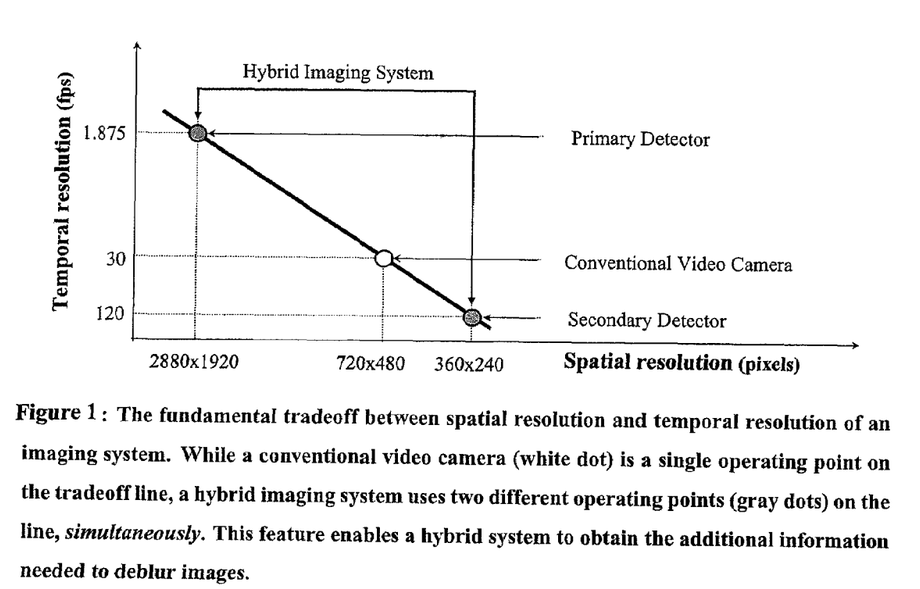
FIG. 1 is a graph illustrating the relationship between temporal resolution and spatial resolution of image detectors.

FIG. 1 shows the linear relationship between spatial resolution (number of pixels) and the temporal resolution (number of images per second (IPS)) for image detectors. The different points shown in FIG. 1 correspond to exemplary cameras with different spatial and temporal characteristics. The spatial and temporal characteristics of a specific camera may be determined by the physical or optical characteristics of the detector materials and the incident light flux. A conventional video camera (shown as an open circle) may have a typical temporal resolution of 30 IPS and a spatial resolution of 720×480 pixels. The hybrid camera systems use two different image detectors—a primary detector having high spatial resolution with low temporal resolution, and a secondary detector having higher temporal resolution but low spatial resolution than the primary detector. A pair of image detectors in an exemplary hybrid imaging system is also depicted in FIG. 1 (closed dots).

Hybrid camera or imaging systems such as those shown in FIGS. 2(a)-2(c) provide the additional motion information needed to deblur images. Each of the systems shown has its own advantageous characteristics. The imaging system shown in FIG. 2a uses a rigid rig of a high-resolution still camera as the primary detector and a low-resolution video camera as the secondary detector. The secondary detector is used for obtaining motion information. The secondary detector may be a black and white detector, which collects more light energy (i.e., over a broader spectrum) and has higher temporal resolution than color specific detectors. The imaging system shown in FIG. 2b uses a common light collection lens and an asymmetric beam splitter arrangement to direct incident light on to primary and secondary detectors. The use of the common lens minimizes any need for relative calibration of the images registered by primary and secondary detectors. The imaging system shown in FIG. 2c uses a portion of an integrated circuit chip (e.g., a CMOS or CCD sensor) as a primary detector and another portion of the integrated circuit chip as the secondary detector. The primary detector portion may include a high resolution central area of the chip. The secondary detector portion may include a low resolution periphery of the chip. The imaging system shown in FIG. 2c may be implemented using binning functions that are now commonly available in CMOS and CCD sensors. A binning function allows the charge of a group of adjacent pixels to be combined before digitization. This binning function may be exploited or activated to configure the chip as hybrid primary-secondary detector.

Figure 3:
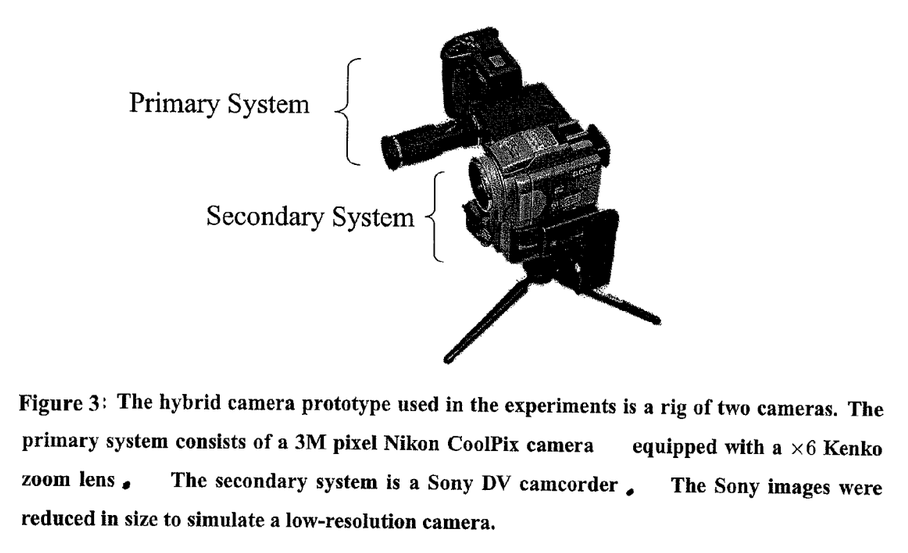
FIG. 3 is an illustration of a prototype hybrid camera constructed from commercially available camera systems in accordance with the present invention.

FIG. 3 shows an exemplary prototype hybrid imaging system. The primary detector of the system is a 3M pixel (2048×1536) Nikon digital camera equipped with a X6 Kenko zoom lens. The secondary detector is a Sony DV camcorder with a modified resolution of 360×240 to simulate a low-resolution detector.

The secondary detectors of the hybrid imaging systems provide information for computing or modeling motion of the imaging system itself in the course of the exposure of a primary detector image. The secondary detectors the hybrid imaging systems in the present applications also provide information for computing or modeling the relative motion of the moving object in addition to providing information on the shape of the moving object. The secondary detector may be configured to take a sequence of images (frames) at fixed time intervals during the exposure of the primary detector image. These frames provide samples of the continuous motion path during the exposure of the primary detector image. The continuous motion path during the exposure of the primary detector image is the concatenation of finite movements motions between successive frames. For the modeling the continuous motion path, the finite motion (translation vector and rotation angle) between successive frames may be approximated by a global rigid transformation:

$$\begin{bmatrix} u \\ v \end{bmatrix} = \begin{bmatrix} \cos\theta & \sin\theta & \Delta x \\ -\sin\theta & \cos\theta & \Delta y \end{bmatrix} \begin{bmatrix} x \\ y \\ 1 \end{bmatrix}$$

where $(\Delta x, \Delta y)$ is the translation vector and $\theta$ is the rotation angle about the optical axis.

In this approximation, the motion between successive frames may be fitted by using a multi-resolution iterative algorithm that minimizes the following optical flow based error function:

$$\arg\min_{(u,v)} \sum \left( u\frac{\partial I}{\partial x} + v\frac{\partial I}{\partial y} + \frac{\partial I}{\partial t} \right)^2$$

where the partial derivatives in the parenthesis are the spatial and temporal partial derivatives of the image I, and (u, v) is the instantaneous motion path at time t.

The fitted discrete samples of the continuous motion path may be used to estimate a continuous motion blur point spread function (PSF). In order to compute the motion of a moving object in the scene, any known tracking method can be used, for example, the method known as KLT (Kanade Lucas Tomasi Feature Tracker), which tracks feature points.

A continuous motion PSF may be defined as an energy distribution function, which can be represented by a convolution kernel k: (x, y)→w, where (x, y) is a location and w is the energy level at that location. The normalized kernel k is subject to the energy conservation constraint:

$$\int\int k(x,y)dxdy = 1,$$

according to which energy is neither lost nor gained by the blurring operation.

Additional constraints are applicable to motion blur PSFs. The motion blur PSF may be parameterized (time) as a path function f: t→(x, y) and an energy function h: t→w. Physical continuity of speed and acceleration require that f (t) should be continuous and at least twice differentiable, where f' (t) is the speed and f" (t) is the acceleration at time t. An assumption that the scene radiance does not change during the exposure corresponds to the result that the amount of integrated energy over any time interval is proportional to the length of the interval. This result can be mathematically formulated as follows:

$$\int_{t}^{t+\delta t} h(t)dt = \frac{\delta t}{t_{end} - t_{start}}, \delta t > 0, t_{start} \le t \le t_{end} - \delta t$$

where $[t_{start}, t_{end}]$ is the image integration or exposure interval.

Figure 4:
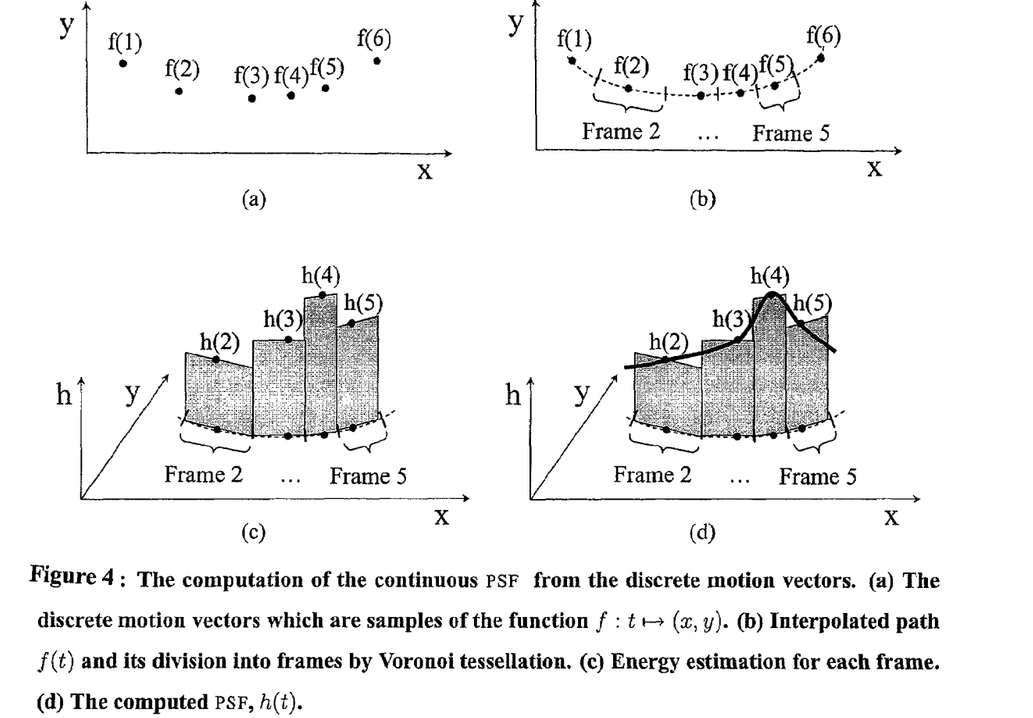
FIGS. 4(a)-4(d) are figurative illustrations of the steps involved the computation of a continuous point spread function from discrete motion vectors in accordance with the present invention.

FIGS. 4a-4d schematically show exemplary steps involved in estimating a continuous motion blur PSF, subject to the foregoing assumptions and constraints. First, path f (t) is estimated by spline interpolation (FIG. 4b) between the discrete motion samples (FIG. 4a). Spline interpolation inherently satisfies the speed and acceleration constraints, as spline functions are mathematically smooth and twice differentiable. Further as shown in FIG. 4(b), Voronoi tessellation techniques may be used to divide path f(t) into segments corresponding to each frame (under a motion centroid assumption). Next, energy function h (t) may be estimated by determining an extent of each frame along the interpolated path. Since the constant radiance assumption implies that frames with equal exposure times integrate equal amount of energy, h(t) may be computed by constructing equal area rectangles at each segment. The height of the equal rectangle at a segment corresponds to the mean energy for the corresponding frame (time). Next as shown in FIG. 4c, h (t) is normalized or scaled to satisfy the energy conservation constraint. An estimated continuous PFS function is obtained by smoothing the normalized h (t). (FIG. 4d). The estimated PFS function may be used as a continuous motion blur PFS for deblurring the primary image.

Once a motion blur PFS is known or estimated, deblurring of motion blur caused by camera shake is conceptually a simple deconvolution operation, which is applied globally to the entire image:

$$\hat{O} = I \otimes^{-1} S,$$

where $\hat{O}$ is the estimated deblurred image, I is the input blurred image, S is the PFS, and $\otimes^{-1}$ denotes deconvolution.

In practice, the deconvolution operation can be computationally intensive or at least iterative. Conventional image deconvolution algorithms may be used for the deconvolution operation. For example, a Richardson-Lucy iterative deconvolution algorithm, which is a non-linear ratio-based method that always produces non-negative gray level values, may be used for image deconvolution. The Richardson-Lucy algorithm, involves maximizing a Poisson-statistics image model likelihood function, yielding the following iteration:

$$\hat{O}^{(k+1)}(x) = \hat{O}^{(k)}(x) \cdot S(-x) \otimes \frac{I(x)}{S \otimes \hat{O}^{(k)}}$$

where: I is the measured image, $\hat{O}(k)$ is the $k^{th}$ estimation of the result, $\hat{O}(0)=I$, and S is the convolution kernel (i.e. the PFS).

The simple deconvolution operation applied globally to an entire image may not be satisfactory for deblurring images in which blur is caused by moving objects in a scene. At least in part, the difficulty in deblurring motion blur caused by a moving object in scene may relate to the fact that image portions corresponding to the moving object blend into image portions corresponding to stationary or static background of the scene.

In accordance with the present invention, de blurring of an image that is blurred by the movement of an object in the scene is accomplished by first separating or decoupling an image portion corresponding to the moving object from an image portion corresponding to the remainder of the scene. Each of the two image portions may deblurred separately as necessary or desired (e.g., to deblur image blurring due to either camera motion and object motion or both) and then superimposed to obtain a deblurred image of the entire scene.

The deblurring operation on moving-object blurred images may mathematically be represented as:

$$\hat{O} = (I - (B \cdot \overline{M} \otimes \overline{S})) \otimes^{-1} S + B \cdot \overline{M},$$

where $\hat{O}$, I, S, and $\otimes^{-1}$ have the same definitions as in the case of the simple deconvolution operation above, M is a segmentation mask for the unblurred object, B is a clear background image, $\otimes$ denotes a 2D convolution, and $\overline{X}$ is the complement of X.

Figure 5:
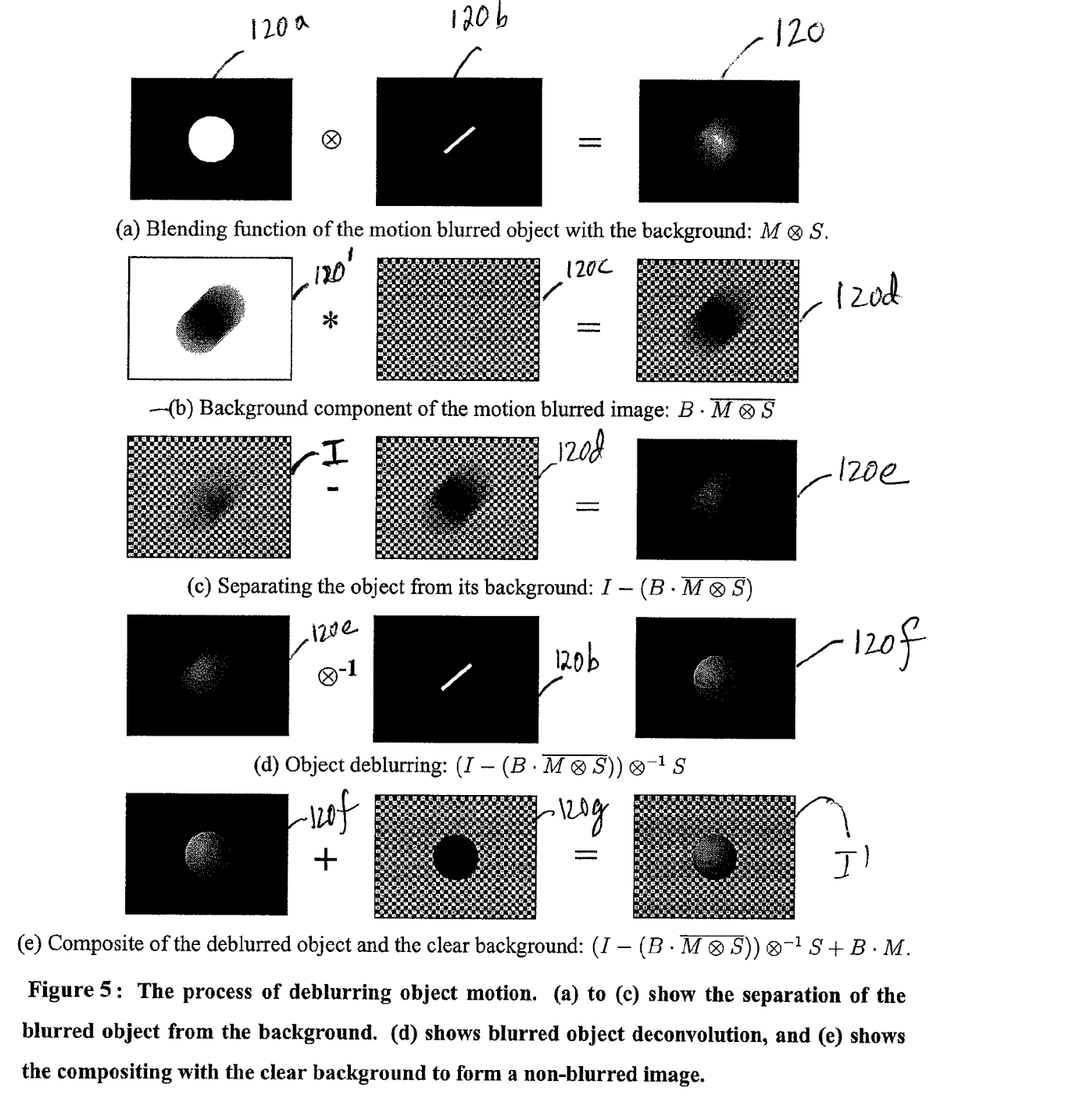
FIGS. 5(a)-5(e) are figurative illustrations of the exemplary steps involved the a process of deblurring moving object images in accordance with the present invention.

FIGS. 5(a)-5(e) schematically show the mathematical or logical steps that are involved in an exemplary deblurring operation of a test image I of a scene (FIG. 5(c)), which includes a moving object. For purposes of illustration, it is assumed that the movement of the object is modeled by a known PSF, which may have been measured and estimated using, for example, any one of the hybrid imaging systems of FIGS. 2(a)-2(c).

FIG. 5(a) shows a test image 120 of the moving object, which is synthesized by convolving an unblurred object segmentation mask 120a with the known PSF 120b. PSF 120b may, for example, represent linear (diagonal) movement of the object. FIG. 5(b) shows a first step in the deblurring operation, at which a background contribution (120d) to image I is associated with the moving object (image 120). For this purpose, the dot product of a clear background image 120c of the scene (with no moving object in it) is taken with image 120'(which is the complement of moving object image 120). Next, FIG. 5(c) shows the step of separating or extraction of a moving object portion or component (120e) of image I by subtraction from image I of the background contribution (120d) associated with the moving object. Once the moving object portion 120e has been extracted or decoupled from the background, it may be motion deblurred. Any suitable deblurring technique including any of the previously described global motion algorithms applied to the object region, or a suitable tracking method such as the aforementioned KLT method may be used. FIG. 5(d) shows deblurring of moving object portion 120e by deconvolution with the PSF 120b, which results in a deblurred moving object portion 120f. Deblurred moving object portion 120f may be superimposed on clear background portion 120g to obtain a unblurred image I' of the scene (FIG. 5(e)).

It will be understood the PSF used in the deblurring scheme described with reference to FIGS. 5(a)-5(e) may be obtained by empirical or by actual measurements.

In some instances (e.g., projectiles or vehicles with known speeds and trajectories) the PSF may be calculated using kinetic theory. In other instances, a hybrid high resolution/low resolution imaging system (see e.g., FIG. 3) may be used to record real-time kinetics of a moving object to obtain a PSF that describes the movement of the object. In some instances, a suitable tracking algorithm may be applied to the low resolution (high frame-rate) video (secondary detector) images captured by the hybrid imaging system to obtain the PSF.

Figure 6:
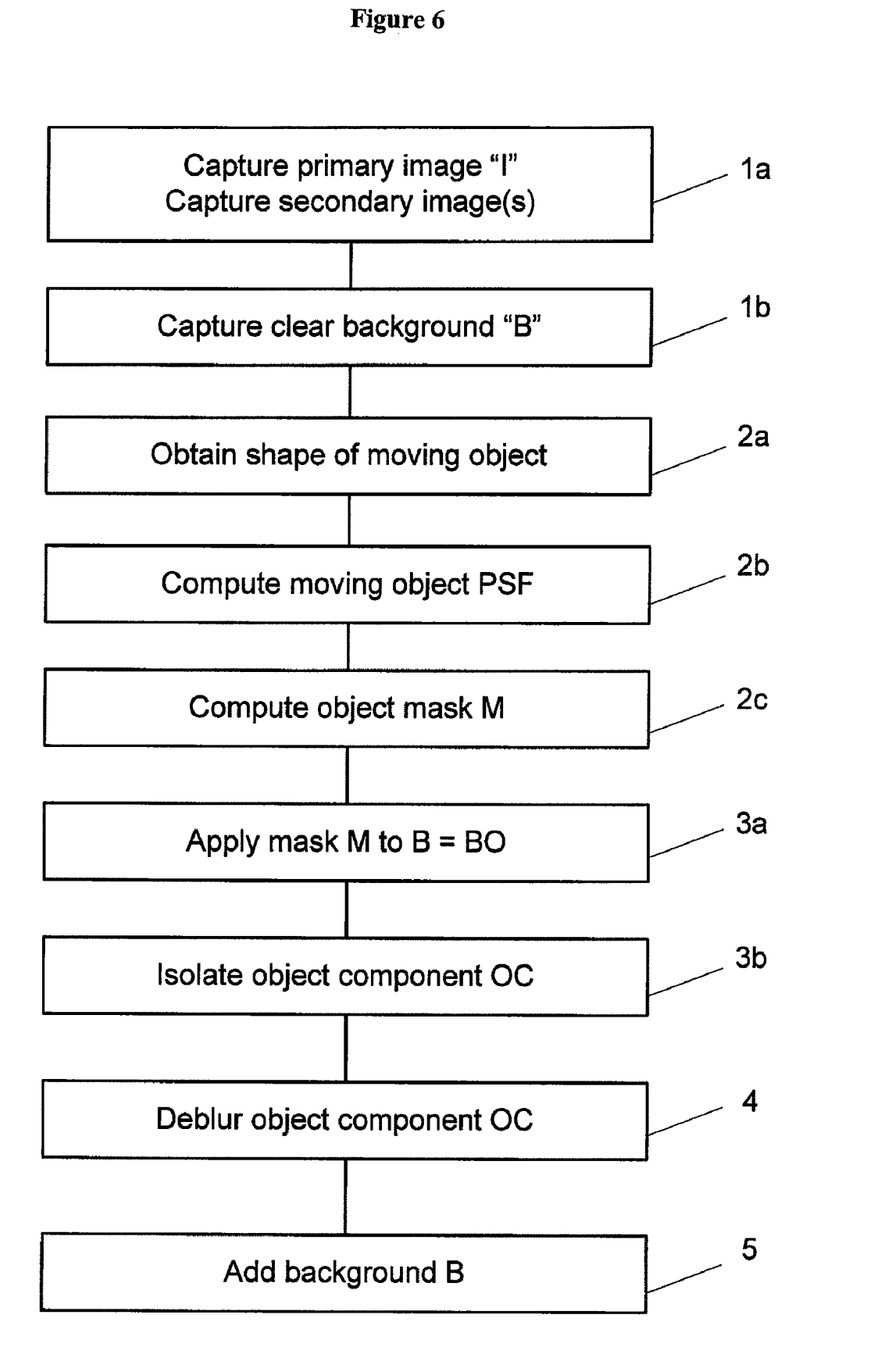
FIG. 6 is a flow diagram of a method for deblurring object motion in scene images in accordance with the present invention.

FIG. 6 shows an exemplary sequence of steps that may be used in a procedure 1400 for deblurring images along the lines described with respect to FIGS. 5(a)-5(e). In procedure 1400 at step 1a, a high-resolution primary image I of the scene with a moving object O in the scene is captured. Also at step 1a, low-resolution secondary image or images of the scene or at least portions of the scene with the moving object O in it are captured. At step 1b, which may be either precedent or subsequent to step 1b, a clear background image B of the scene without the moving object O in it is captured. An exemplary high-resolution clear background image background B may be generated by capturing several high-resolution images of the scene and median filtering the brightness level at each image pixel.

At step 2a, which may be either precedent or subsequent to step 2b, a shape of the moving object is determined. At step 2b, a PSF, which models the movement of the moving object, is computed, for example, by processing the information in the primary and secondary images (step 1a). This PSF is then applied to the shape of the moving object to generate an object mask or filter M (step 2c). Mask M is applied to the clear background image B, at step 3a, to isolate an image background component BO that corresponds to portions of B without the moving object. At next step 3b, background component BO is subtracted from image I to isolate an "blurred" component OC associated with the moving object O.

The blurred component OC is deblurred by image deconvolution with the known PSF at step 4. Finally, at step 5 the deblurred object component OC is superimposed on clear background image B to obtain a deblurred image of the scene with the moving object O in it.

FIGS. 7(a)-7(d) show a demonstrative example of the effectiveness of procedure 1400 in deblurring images of scenes having internal moving objects. For this example, a synthetically blurred image 1320 of scene with a moving cluster of balloons (FIG. 7(b)) was used as a test image. Test image 1320 was synthesized from a high-resolution image 1310 of the scene using a known PSF (S) to model the movement of the balloons. An exemplary high-resolution clear background image B, and a mask M were available. For the demonstrative example, a low resolution mask M was generated by down-sampling mask M to 1/64 of its original size for computational convenience. Test image 1320 was synthesized as follows:

$$I = (F \otimes S) + (B \cdot \overline{M \otimes S})$$

where F is the foreground image.

Test image 1320 was then deblurred using procedure 1400 to selectively deblur motion blur due to movement of the cluster of balloons. Image blending due to motion blur was assumed to be linear. Test image 1320 is mathematically expressed as:

$$\hat{O} = (I - (B \cdot \overline{M \otimes S})) \otimes^{-1} S + B \cdot \overline{M},$$

Figure 7:
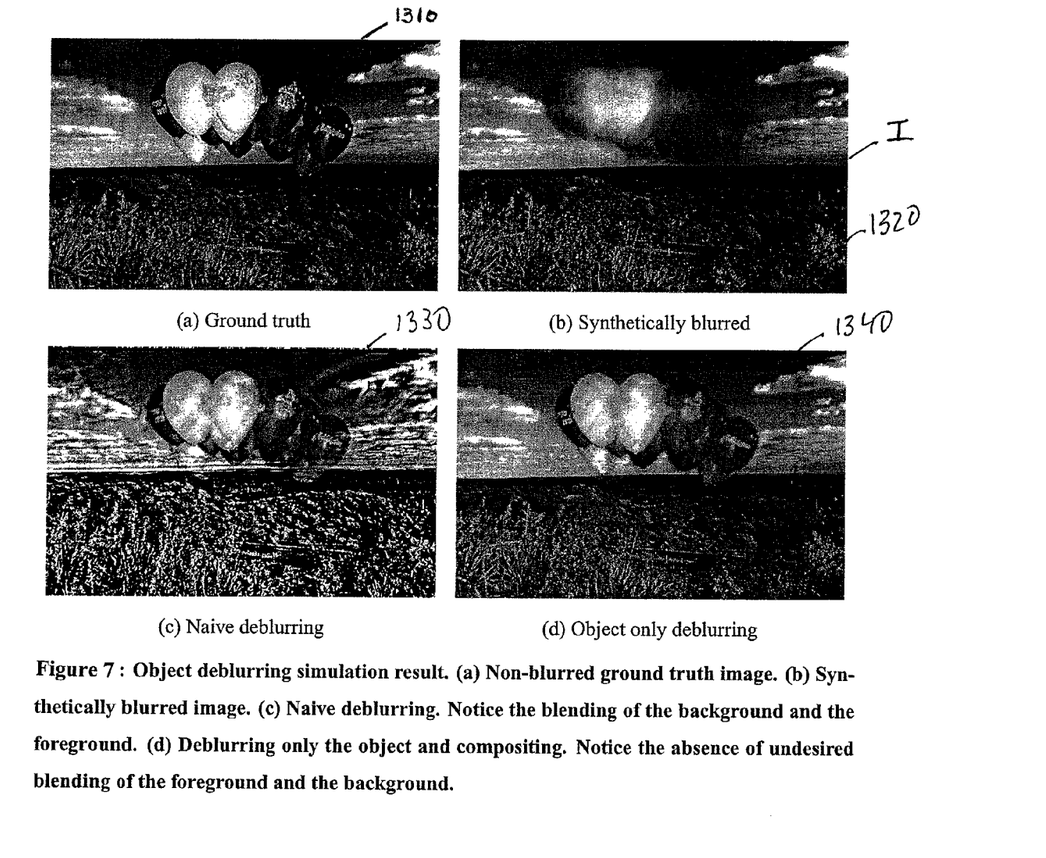
FIGS. 7(a)-7(d) are figurative illustrations of a demonstrative and comparative application of the process of deblurring object motion of the present invention.

FIG. 7(d) shows the result of this object deblurring procedure (image 1340). For comparison image 1320 was also naively deblurred using a global motion model (image 1330). A comparison of images 1330 and 1340 demonstrates the effectiveness of the moving object deblurring procedure. Image 1340 shows that a low resolution mask M is sufficient to prevent undesirable blending of the foreground and the background that is seen in image 1330.

Further detail of the moving object deblurring technique and utility of the low resolution mask for blending superimposed images is described with reference to FIGS. 8(a)-8(e) and FIGS. 9(a)-9(b).

Figure 8:
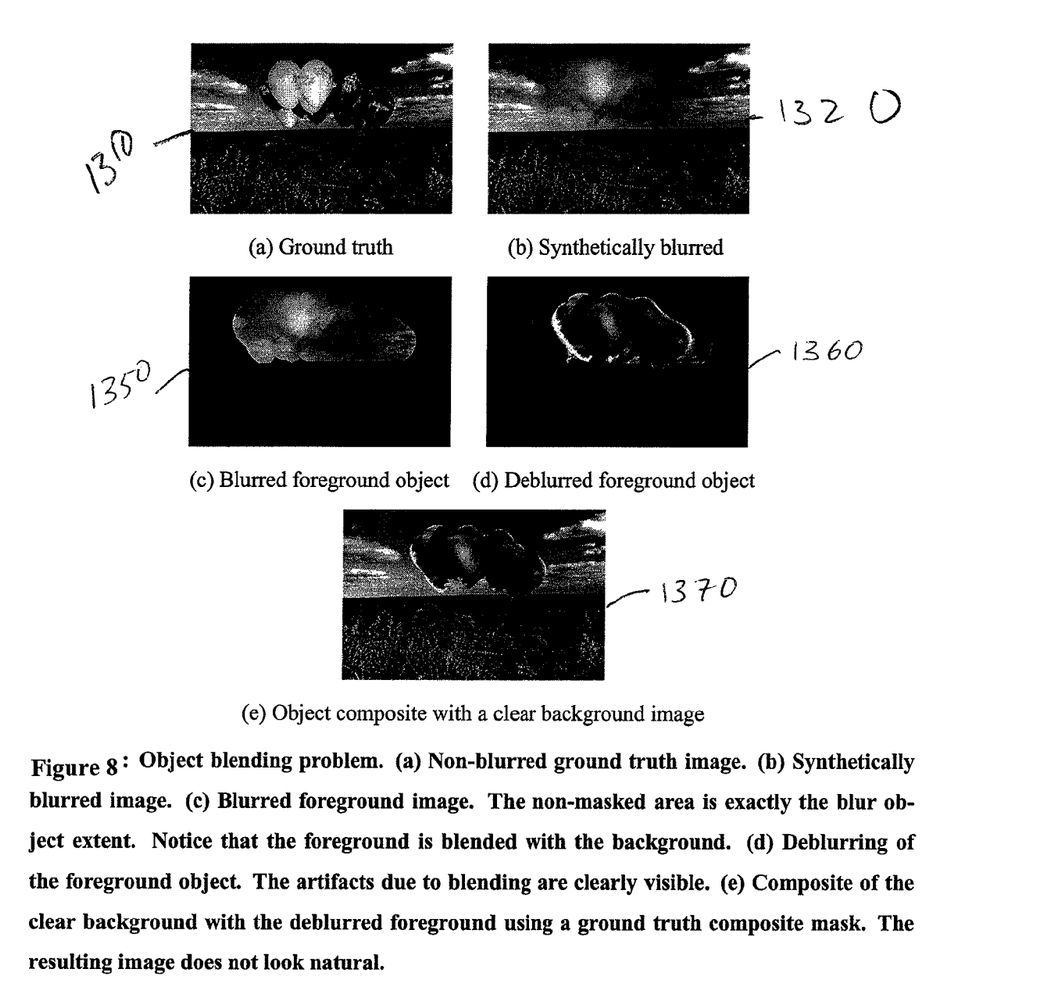
FIGS. 8(a)-8(e) and FIGS. 9(a)-9(e) illustrate, with reference to deblurring of the image FIG. 7(b), the advantages of using a low resolution object segmentation mask in the process of deblurring object motion, in accordance with the present invention.

FIGS. 8(a) and 8(b), which are identical to FIGS. 7(a) and 7(b), show ground truth image 1310 and synthetically blurred image 1320, respectively. FIG. 8(c) shows a part of the scene image 1350 that contains the blurred foreground object (i.e., the moving balloons). Blending of the foreground and the background is visible in image 1350. FIG. 8(d) shows a result of deconvolving the foreground object with the known PSF (image 1360) (high resolution image). Image 1360 may have an artificial or unnatural appearance (e.g., a cut and paste appearance) when superimposed on the background (image 1370, FIG. 8((e)).

Figure 9:
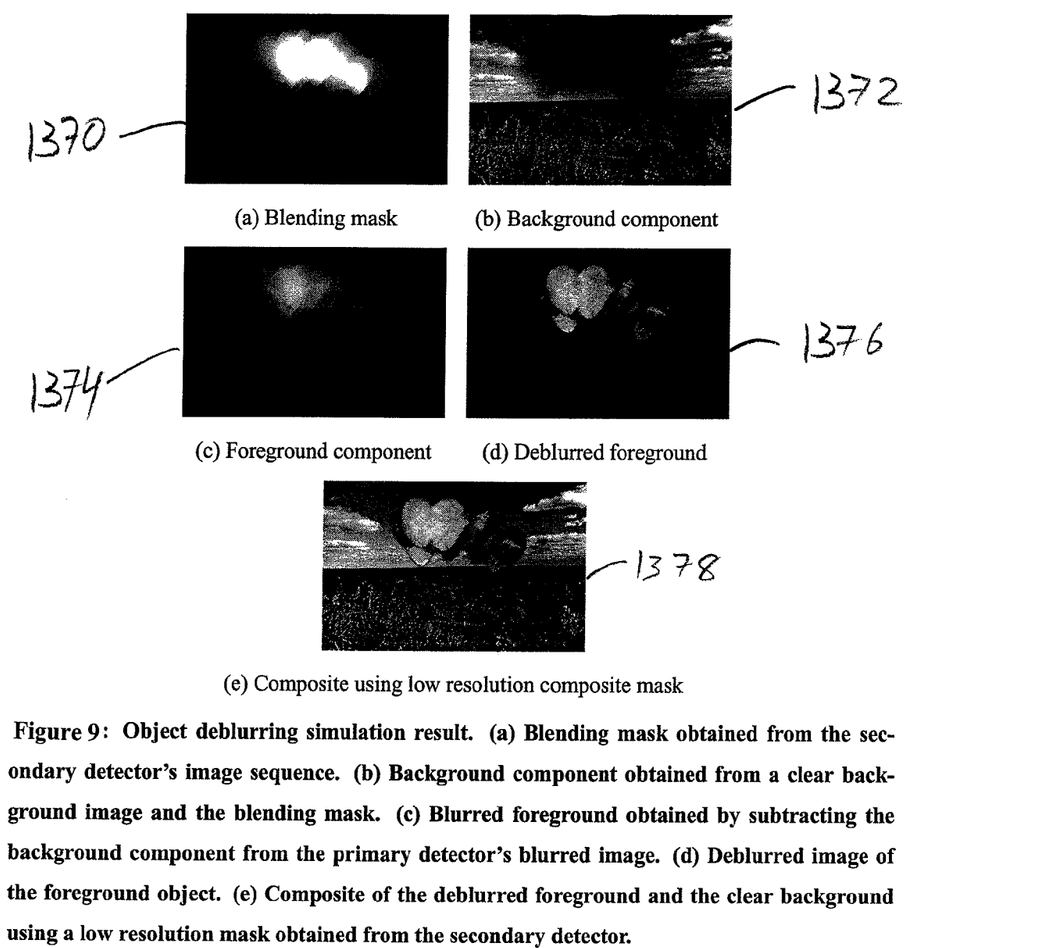

FIGS. 9(a)-9(e) show the effectiveness of a low resolution mask (e.g., mask M) in deblurring image 1320. FIG. 9(a) shows the blending mask 1370 ($M \otimes S$) of the foreground. FIGS. 9(b) and 9(c) respectively show the background component 1372 ($B \cdot \overline{M \otimes S}$) and the foreground component 1374 ($1 - B \cdot \overline{M \otimes S}$) of blurred image 1320. FIG. 9(d) shows the deblurred foreground object 1376, and FIG. 9(e) shows the superimposed deblurred image 1378 obtained by using a low resolution mask.

Thus, procedure 1400, may be advantageously deployed for image deblurring using minimal additional resources (e.g., a hybrid imaging system) over previous deblurring methods. Procedure 1400 may, for example, find application in aerial surveillance or remote sensing systems where vehicle translation that cannot be corrected by gyro-based stabilization degrades the quality of acquired images. Procedure 1400 also may be applied to digital photography, wherein it may advantageously provide motion deblurring solutions for digital cameras designed for consumer use. The digital cameras that are designed for consumer use may have small yet powerful zoom lenses, which make them prone to severe motion-blur, especially when used by a non-professional photographer. Procedure 1400, which is passive, can be readily incorporated in such digital cameras. Low-cost chips having a low spatial resolution and high temporal resolution, (e.g., similar to those used in optical mouse devices for personal computers) may be incorporated in the digital cameras to serve as secondary detectors for collecting object motion information. The digital cameras may be configured with suitable microprocessor arrangements to deblur images automatically (using procedure 1400). Alternatively, images may be deblurred upon user request. In some instances, a host computer to which images can be downloaded may be used to deblur the images.

Procedure 1400 for deblurring images that are blurred by an object moving in the foreground of a stationary or static scene background, is readily extended to instances in which it is not possible to obtain a clear non-blurred image of the background, or to obtain a clear deblurred image of the background (e.g., which may be blurred due to camera motion). In such instances, the image of the background may be independently deblurred by image deconvolution with a PSF which describes the blurring motion (e.g., camera shake) the background. The dual image deconvolution involving two PSFs may be described by the following operation:

$$O = (I - ((B \otimes^{-1} S_{bc}) \otimes S_{bo} \cdot \overline{M \otimes S_f})) \otimes^{-1} S_f + B \cdot M,$$

where $S_{bc}$ and $S_{bo}$ are the PSFs of the background in the clear image and in the image with the blurred object, respectively, and $S_f$ is the PSF of the foreground object.

The foregoing merely illustrates the principles of the invention. Various modifications and alterations to the described embodiments will be apparent to those skilled in the art in view of the teachings herein. For example, the foregoing techniques may be applied to video sequences taken by a moving camera, using an assumption of symmetrical distribution to recover the average motion vectors from the motion blurred images. It will thus be appreciated that those skilled in the art will be able to devise numerous systems and methods which, although not explicitly shown or described herein, embody the principles of the invention and are thus within the spirit and scope of the invention.

The invention claimed is:

1. A method for deblurring images of a scene that includes a moving object, the method comprising, obtaining a blurred primary image I of the scene that includes the moving object at a first resolution;

obtaining at least two secondary image of the scene at a second resolution in addition to the blurred primary image of the scene at the first resolution;

analyzing the at least two secondary images of the scene at the second resolution for information on the movement of the object; and estimating a point spread function S that models the movement of the moving object based on information on the movement of the object in the at least two secondary images of the scene;

obtaining a background image B of the scene;

obtaining a shape of the moving object;

computing a mask M from the shape of the moving object and the point spread function from the secondary images;

applying the mask to the background image B to isolate a static background component not associated with the moving object;

isolating a moving object component of the primary image I;

deblurring the moving object component by image deconvolution with the point spread function; and superimposing the deblurred moving object component and a background component to obtain a deblurred primary image of the scene.

2. The method of claim 1 wherein obtaining at least two secondary images of the scene in addition to the blurred primary image of the scene comprises using a hybrid imaging system with multiple detectors to capture the images of the scene.

3. The method of claim 2 wherein obtaining at least one secondary image of the scene in addition to the deblurred primary image of the scene comprises obtaining a secondary image at a lower spatial resolution than that the primary image.

4. The method of claim 1 wherein obtaining a point spread function S that models the movement of he moving object, comprises estimating a continuous point spread function.

5. The method of claim 1 wherein obtaining a point spread function S that models the movement of he moving object, comprises computing a point spread function using kinetic theory.

6. The method of claim 1 wherein obtaining a clear background image B of the scene comprises capturing several high-resolution images of the scene and median filtering the brightness level at each image pixel.

7. The method of claim 1 wherein isolating a moving object component of the primary image I comprises subtracting the static background component from the primary image I.

8. The method of claim 1 wherein obtaining a background image B comprises deblurring a motion blurred background image.

9. An image processor for deblurring a primary image I of a scene captured with a primary detector, wherein the primary image I is blurred due to the movement of an object in the scene, the processor comprising:

a first arrangement for separating a moving object component from the primary image I;

a second arrangement for deblurring the moving object component by image deconvolution; and a third arrangement for superimposing the deblurred moving object component on a background image of the scene to obtain a deblurred primary image of the scene, wherein the second arrangement for deblurring the moving object component by image deconvolution, comprises:

a hybrid imaging system having a secondary detector associated with the primary detector with which the prim image I is captured, wherein the secondary detector is configured to capture second images of the scene for motion analysis at a second resolution; and an arrangement for estimating a point spread function from the secondary images of the scene for motion analysis at a second resolution and deconvolving it with the moving object component.

10. The image processor of claim 9, wherein the motion analysis comprises estimating point spread function which models the movements of the moving object in the imaged scene.

11. The image processor of claim 9 wherein the background image of the scene comprises an image the portion of the scene that is stationary.

12. The image processor of claim 9 wherein the first arrangement for separating a moving object component from the primary image I comprises a segmentation mask.

13. The image processor of claim 12 wherein the segmentation mask is constructed from a shape oft object and a point spread function which models the movements of the moving object in the imaged scene.

14. The image processor of claim 9 wherein at least one of the three arrangements is disposed in a digital photography camera.

15. The image processor of claim 9 wherein at least one of the three arrangements is disposed in a personal computer to which primary images are downloaded for processing.

16. The image processor of claim 9 wherein the background image of the scene comprises a deblurred image of the portion of the scene that is stationary.

* * * * *